(12) United States Patent
Krishnamoorthy et al.

(10) Patent No.: US 11,624,536 B2
(45) Date of Patent: Apr. 11, 2023

(54) EXPANSION VALVE POSITION DETECTION IN REFRIGERATION SYSTEM

(71) Applicant: Hill Phoenix, Inc., Conyers, GA (US)

(72) Inventors: Naresh Kumar Krishnamoorthy, Kerala (IN); Shobin Balakrishnan, Bengaluru (IN)

(73) Assignee: Hill Phoenix, Inc., Conyers, GA (US)

(*) Notice: Subject to any disclaimer, the term of this patent is extended or adjusted under 35 U.S.C. 154(b) by 133 days.

(21) Appl. No.: 16/868,707

(22) Filed: May 7, 2020

(65) Prior Publication Data
US 2021/0348819 A1 Nov. 11, 2021

(51) Int. Cl.
*F25B 49/02* (2006.01)
*F25B 41/22* (2021.01)
*F25B 41/31* (2021.01)
*F25D 29/00* (2006.01)
*F25D 11/00* (2006.01)

(52) U.S. Cl.
CPC .............. *F25B 49/02* (2013.01); *F25B 41/22* (2021.01); *F25B 41/31* (2021.01); *F25D 11/00* (2013.01); *F25D 29/003* (2013.01)

(58) Field of Classification Search
CPC .......... F25B 49/02; F25B 41/31; F25B 41/22; F25B 2600/2513; G05D 16/2013; G05B 23/02
See application file for complete search history.

(56) References Cited

U.S. PATENT DOCUMENTS

| | | | | |
|---|---|---|---|---|
| 5,264,770 A | * | 11/1993 | Coutu | H02P 8/12 318/696 |
| 2005/0210899 A1 | * | 9/2005 | Maier | F25B 41/22 62/216 |
| 2006/0176007 A1 | * | 8/2006 | Best | H02P 8/08 318/685 |
| 2020/0011197 A1 | * | 1/2020 | Lindgren | F16K 17/02 |

* cited by examiner

*Primary Examiner* — Schyler S Sanks
(74) *Attorney, Agent, or Firm* — Fish & Richardson P.C.

(57) ABSTRACT

A refrigerated display case having a housing defining a temperature controlled space and a refrigeration system coupled to the housing is provided. The refrigeration system is configured to be operable to affect a temperature of the temperature controlled space. The refrigeration system includes an actuator, a controller, and a sensor. The controller is configured to continuously update a stored position of the actuator based on measurement of an electric current provided to the actuator, retrieve the stored position after a power failure, and restart control based on the stored position of the actuator. The sensor is configured to communicate with the controller.

20 Claims, 9 Drawing Sheets

EXPANSION VALVE POSITION DETECTION IN REFRIGERATION SYSTEM

BACKGROUND

The present disclosure relates generally to the field of refrigeration and refrigerated display cases. More specifically, the present disclosure relates to the field of controllers and diagnostic systems for refrigeration systems.

SUMMARY

One embodiment of the present disclosure relates to a refrigerated display case. The refrigeration system includes a housing defining a temperature controlled space, and a refrigeration system, coupled to the housing. The thermal exchange system is configured to selectively control a temperature of the temperature controlled space. The thermal exchange system includes an actuator, and a controller. The controller is configured to determine a position of the actuator; and store the position of the actuator such that the position of the actuator is retrievable by the controller.

Another embodiment of the present disclosure relates to a method of monitoring valve deflection in a refrigeration system. The method includes determining a position of an expansion valve based on a current supplied to an actuator configured to selectively control the expansion valve and storing the position of the expansion valve such that the position is retrievable by a controller in the event of a power failure.

Another embodiment of the present disclosure relates to a method of calibrating an expansion valve controller. The method includes providing, by a controller, a first signal to an actuator. The method also includes detecting, by a sensor, a current supplied to the actuator and storing, the current to a non-volatile memory of the controller. The controller determines a position of the stepper motor based on the current.

DETAILED DESCRIPTION

Referring generally to the FIGURES, a refrigeration system and components thereof are shown, according to various exemplary embodiments. The refrigeration system may be a vapor compression refrigeration system. In some implementations, the refrigeration system may be used to provide cooling for temperature controlled display devices in a supermarket or other similar facility.

In some embodiments, the refrigeration system includes a receiving tank (e.g., a flash tank, a refrigerant reservoir, etc.) containing refrigerant, a condenser assembly, a compressor assembly, an accumulator, a subcooler assembly, and a superheater assembly. The refrigeration system includes a controller for monitoring and controlling the pressure, temperature, and/or flow of the refrigerant throughout the refrigeration system. The controller can operate each of the assemblies (e.g., according to the various control processes described herein) to efficiently regulate the pressure of the refrigerant within the receiving tank. Additionally, the controller can interface with other instrumentation associated with the refrigeration system (e.g., measurement devices, timing devices, pressure sensors, temperature sensors, etc.) and provide appropriate control signals to a variety of operable components of the refrigeration system (e.g., compressors, valves, power supplies, flow diverters, etc.) to regulate the pressure, temperature, and/or flow at other locations within the refrigeration system. Advantageously, the controller may be used to facilitate efficient operation of the refrigeration system, reduce energy consumption, improve system performance, and diagnose problems within the system.

Before discussing further details of the refrigeration system and/or the components thereof, it should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids, transmission of forces, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
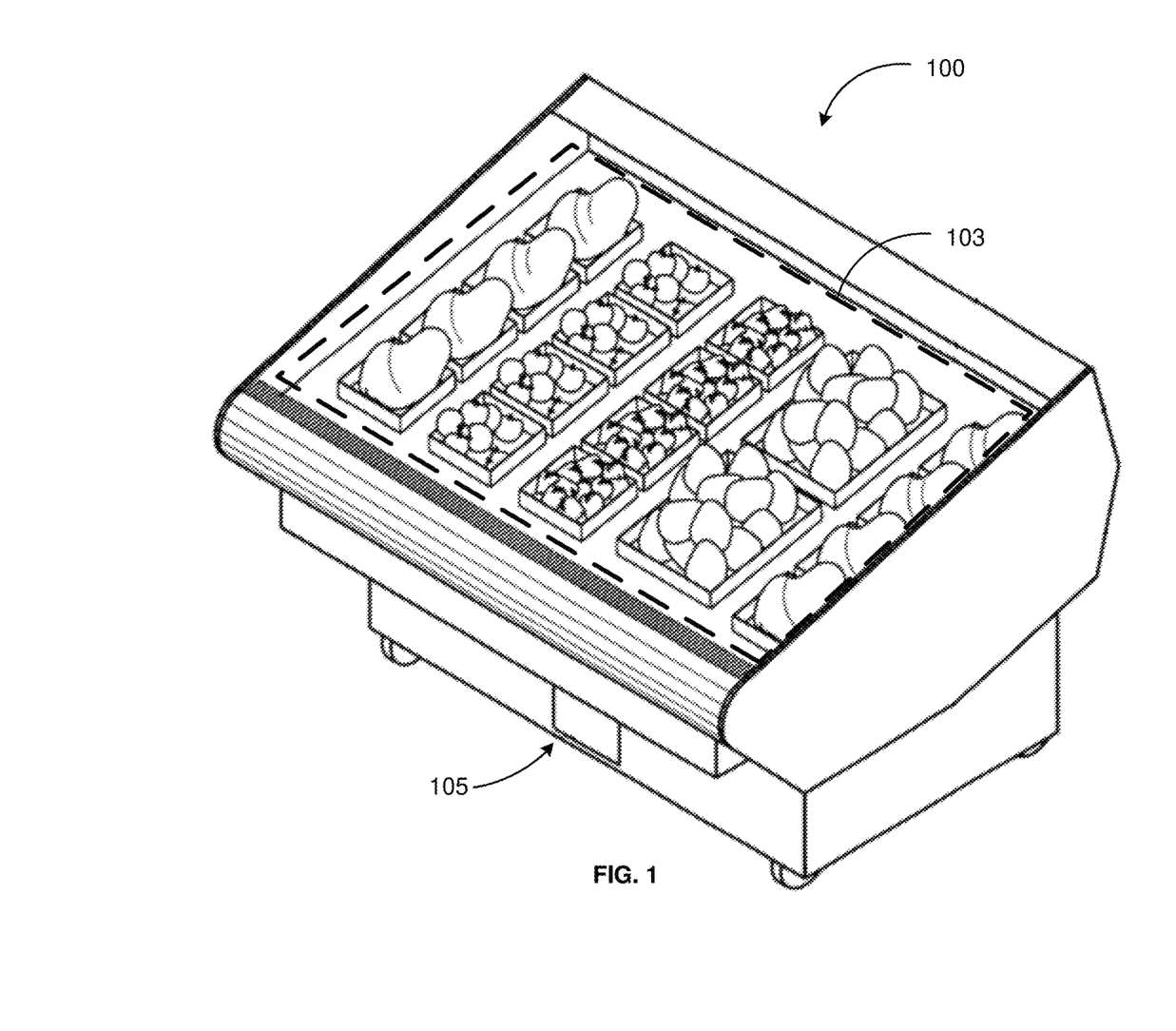
FIG. 1 is a perspective view of a refrigerated display case according to an exemplary embodiment.

Referring now to FIG. 1, a perspective view of a refrigerated display case 100 is shown, according to an exemplary embodiment. The refrigerated display case 100 includes a refrigeration body 101 which defines a temperature controlled space 103. The refrigerated display case 100 may include a mechanical-compression refrigeration system, an absorption refrigerating system, an evaporative cooling system, or a thermoelectric refrigeration system configured to selectively control a temperature of the temperature controlled space 103. In some embodiments, the refrigerated display case 100 may be a standalone unit. In other embodiments, the refrigerated display case 100 may be part of a larger refrigerated display case system.

Figure 2:
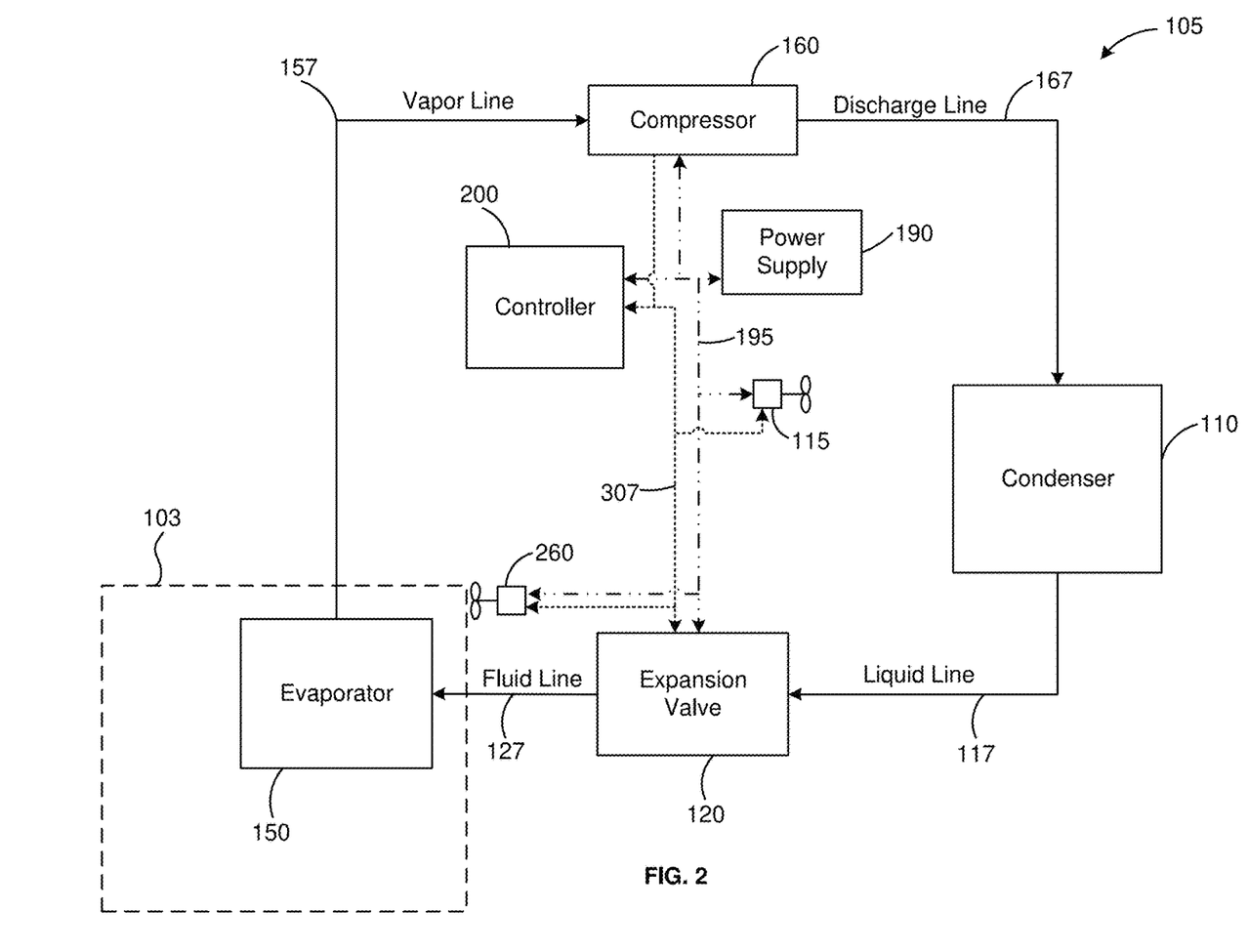
FIG. 2 is a block diagram of a refrigeration system and associated components, according to an exemplary embodiment.

Referring now to FIG. 2, a block diagram of a refrigeration system 105 is shown, according to an exemplary embodiment. The refrigeration system 105 is coupled to and configured to selectively control the temperature of the temperature controlled space 103. The refrigeration system 105 includes a refrigerant disposed therein. The refrigerant is configured to facilitate thermal energy exchange throughout the refrigeration system 105. The refrigeration system 105 also includes a condenser assembly 110 configured to facilitate thermal energy loss from the refrigerant. The condenser assembly 110 includes a fan 115 configured to assist in the thermal energy loss. The condenser assembly 110 is fluidly coupled to an expansion valve assembly 120 by liquid line 117.

The expansion valve assembly 120 is configured to facilitate a pressure drop in the refrigerant. During the pressure drop, the refrigerant changes phase from a liquid to a vapor. The expansion valve assembly 120 is fluidly coupled to an evaporator assembly (e.g., a coil, etc.) 150 by fluid line 127.

The evaporator assembly 150 is coupled to the temperature controlled space 103. The evaporator assembly 150 is configured to facilitate thermal energy gain in the refrigerant. The evaporator assembly 150 includes a fan 155 configured to assist in the thermal energy gain. The evaporator assembly 150 is fluidly coupled to a compressor assembly 160 by vapor line 157. The compressor assembly 160 is configured to increase the pressure of the refrigerant. The compressor assembly 160 is fluidly coupled to the condenser assembly 110 by a discharge line 167.

The refrigeration system 105 also includes a power supply 190 and a controller 200. The controller 200 is configured to send and receive control signals to each of the components of the refrigeration system 105. As shown the controller 200 is coupled to the fan 115, the expansion valve assembly 120, the fan 155, the compressor assembly 160, and the power supply 190 by control line 307. In additional exemplary embodiments, the controller 200 may be coupled to each of the components of the refrigeration system 105 such that the controller 200 can send and receive signals from each of the components of the refrigeration system 105. Furthermore, the control lines may be configured to facilitate the exchange of data, signals (e.g., analog or digital), power, etc.

The power supply 190 is coupled to (1) the fan 115, (2) the expansion valve assembly 120, (3) the fan 155, (4) the compressor assembly 160, and (5) the controller 200 by power line 195. In some embodiments, the controller 200 is also configured to facilitate power delivery to each of the components of the refrigeration system 105 by the power line 195. In the embodiment shown in FIG. 2, the power supply 190 is directly electrically coupled to the controller 200 by power line 195. In other embodiments, the power supply 190 may be indirectly coupled to each of the components of the refrigeration system 105 via the controller 200. In a different embodiment, the power supply 190 may be directly electrically coupled to each of the components of the refrigeration system 105. In this embodiment, the controller 200 may control the power supply 190 to selectively provide power to each of the components of the refrigeration system 105.

In other exemplary embodiments, the refrigeration system 105 may be configured as a thermal exchange system (e.g., refrigeration system, air conditioning system, heat pump, etc.) configured to facilitate thermal energy exchange. In these embodiments, the system may include the same or similar components, assemblies, and control logic as the refrigeration system 105.

Figure 3:
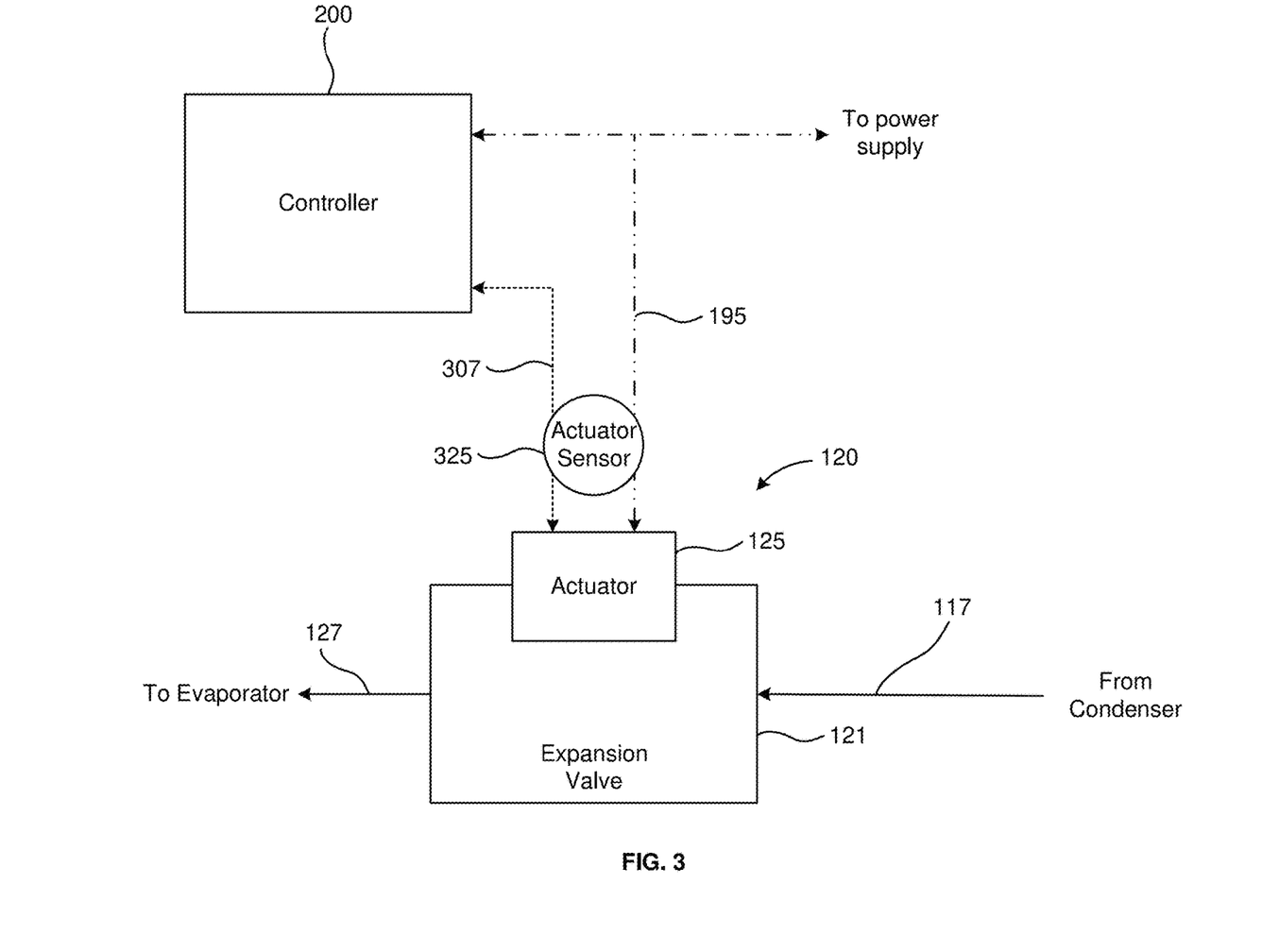
FIG. 3 is a block diagram of the refrigeration system of FIG. 2, according to an additional exemplary embodiment.

Now referring to FIG. 3, an additional exemplary embodiment of the block diagram of FIG. 2 is shown. The controller 200 is shown as coupled to the expansion valve assembly 120 by control line 307. The expansion valve assembly 120 is shown as including an expansion valve 121 and an actuator 125 (e.g., pneumatic actuator, hydraulic actuator, D/C motor, A/C motor, etc.). The actuator 125 is configured to receive a control signal from controller 200 via the control line 307 and actuate the expansion valve 121.

In some embodiments, the actuator 125 may be configured as a stepper motor. In this configuration, the actuator 125 selectively actuates the expansion valve 121 to a plurality of positions. A first position may be a fully open position. A second position may be a fully closed position. Other positions may be disposed between the first position and the second position.

An actuator sensor 325 is coupled to the actuator 125 by control line 307, as shown. The actuator sensor 325 is configured to continually collect data about the actuator 125. The actuator sensor 325 is further configured to selectively send the collected data to the controller 200 by the control line 307.

In other embodiments, the actuator sensor 325 may be integrated with the actuator 125 such that the actuator sensor 325 and the actuator 125 are a single unit. In one exemplary embodiment, the actuator sensor 325 may be configured to detect an electrical event within the expansion valve assembly 120. For example, the actuator sensor 325 may be configured to detect a voltage, a current, a power, or other electrical property (e.g., voltage spike, current spike, power spike, etc.) of the expansion valve assembly 120.

Figure 4:
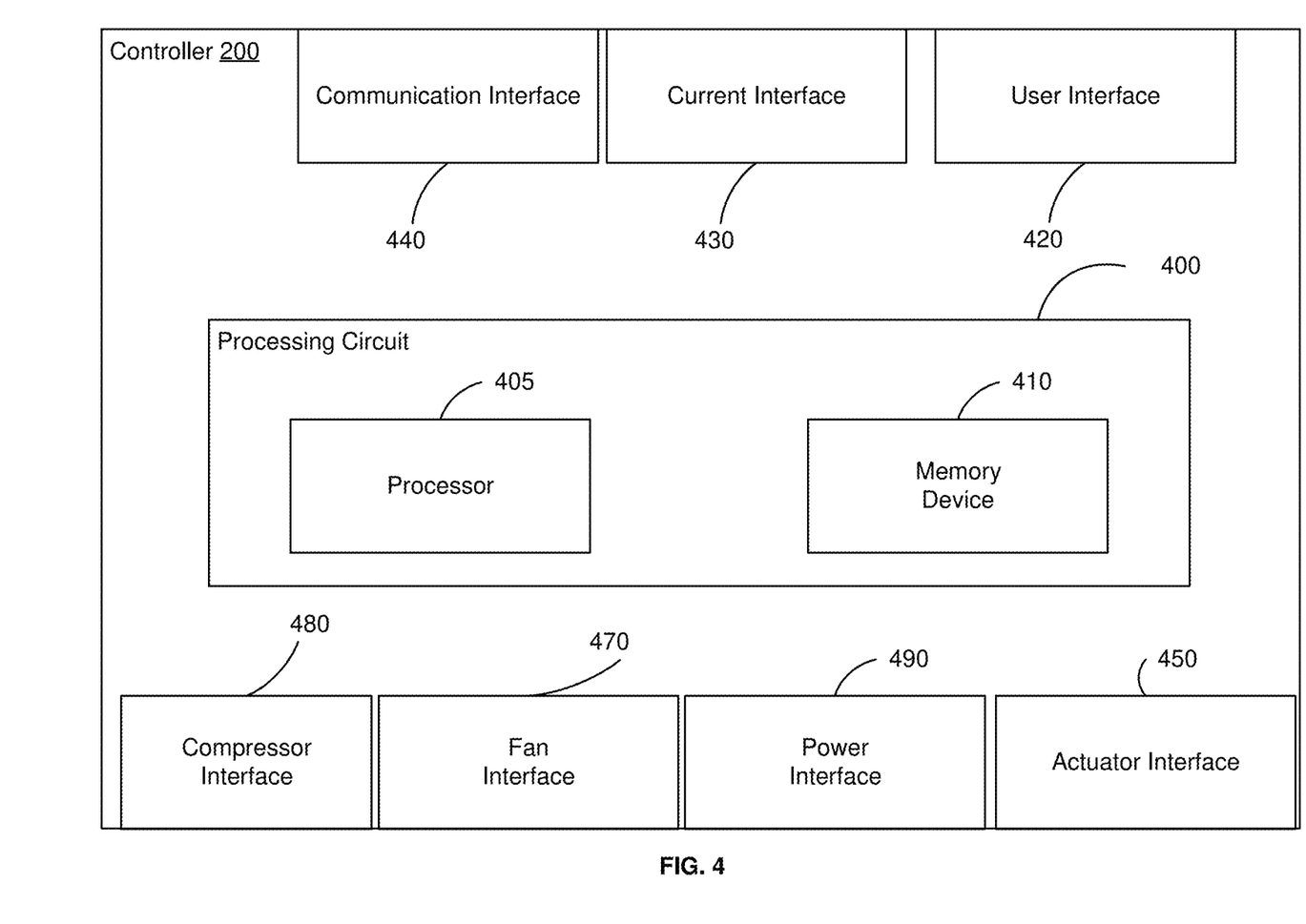
FIG. 4 is a block diagram of a controller for the refrigeration system of FIG. 2 and associated components, according to an exemplary embodiment.

Now referring to FIG. 4, a block diagram of the controller 200 is shown, according to an exemplary embodiment. The controller 200 includes a processing circuit 400. The processing circuit 400 includes a processor 405 and a memory device 410. The processing circuit 400 is coupled to various interfaces (e.g., input/output devices) on the controller 200. The processing circuit 400 is configured to receive and transmit data from the interfaces on the controller 200.

The controller 200 includes a user interface 420. The user interface 420 is configured to facilitate communication between a user and the controller 200. For example the user interface 420 may be configured to facilitate data reception from a user input such as ambient pressure, ambient temperature, desired superheat or subcooling conditions, or other parameters relevant to the operation of the refrigeration system 105 (see FIG. 2). Additionally, the user interface 420 may be configured to facilitate data transfer from the controller 200 to the user such as data collected by various sensors of the refrigeration system 105. For example, the user interface 420 may be configured to interface with a display (e.g., LCD, OLED, etc.), an audio device (e.g., speaker, etc.), or an indication device (e.g., LED, etc.) configured to present the data to the user. Additionally, the user interface may be configured to receive input from the user by an analog input device, a digital input device, or by a communication interface 440 (e.g., buttons, switches, touch displays, mobile devices, etc.). The user interface 420 may be configured to present operational data about the refrigeration system 105. For example, the user interface 420 may be configured to relay to the user the position of the actuator 125 (see FIG. 3).

The controller 200 also includes a sensor interface 430. The sensor interface is configured to facilitate data transfer between sensors within the refrigeration system and the controller 200. For example, the sensor interface 430 may be configured to receive data about the actuator 125 from the actuator sensor 325. In one embodiment, the sensor interface 430 is configured to receive data about the current supplied to the actuator 125 and send the data to the processing circuit 400.

The controller 200 also includes a communication interface 440. The communication interface 440 may be configured to facilitate data transfer over a wired connection (e.g., Ethernet, thunderbolt, etc.) or a wireless connection (e.g., Wi-Fi, Bluetooth, etc.) between the controller 200 and a user device (e.g., computer, phone, etc.). The communication interface 440 may also be configured to interface with the user interface 420 such that user interface 420 may send and receive data via the communication interface 440.

The controller 200 also includes an actuator interface 450. The actuator interface 450 is configured to facilitate control of the actuator 125 by the controller 200. For example, the processor 405 may send a signal by the actuator interface 450 to the actuator 125 to move to a predetermined position, or to a position relative to the current position.

The controller 200 also includes a fan interface 470 and a compressor interface 480. The fan interface 470 is configured to facilitate control of system fans (e.g., fan 115 and fan 155) by the controller 200. For example, the processor 405 may send a signal by the fan interface 470 to the fan 115 to increase or decrease off the compressor. The compressor interface 480 is configured to facilitate control of the compressor assembly 160 of FIG. 2 by the controller 200. For example, the processor 405 may send a signal by the compressor interface 480 to the compressor assembly 160 to power on, power off, or run at a desired setting.

The controller 200 also includes a power interface 490. The power interface 490 is configured to interface with the power supply 190. In some embodiments, the power interface 490 is configure to directly interface with each of the components of the refrigeration system 105. For example, the power interface 490 may be configured to interface with the compressor assembly 160 to facilitate power delivery to the compressor assembly 160. In other embodiments, the power interface 490 is configured to indirectly interface with each of the components of the refrigeration system 105. For example, the power interface 490 may be configured to send a signal to the power supply 190 to facilitate power delivery to the compressor assembly 160.

The controller 200 is configured to determine the position of the actuator 125 based on data received from the actuator sensor 325. For example, the controller 200 may send a signal to the actuator 125 to move in a direction relative to the current position (e.g., to close the valve more or to open the valve more). Alternately, the controller 200 may send a signal to the actuator 125 to move to a particular position based on the operating conditions of the refrigeration system 105 (e.g., superheat conditions, pressure of the refrigerant, etc.). The controller 200 may also directly or indirectly provide power to the actuator 125 based on the desired position. The actuator 125, responsive to the signal and power may begin actuating. The actuator sensor 325 may detect an electrical property of the actuator 125 before, during, and after the actuator 125 is in motion. For example, the actuator sensor 325 may detect the current supplied to the actuator 125. In other embodiments, the actuator sensor 325 may detect the voltage or the power supplied to the actuator 125. The actuator sensor 325 may send the controller 200 data that the actuator sensor 325 collected about the current supplied to the actuator 125. The controller 200 may receive the data about the actuator 125 by the sensor interface 430. The processor 405 may then determine an absolute or relative position of the actuator 125 based on the data.

In one exemplary embodiment, the controller 200 may determine the position of the actuator 125 by counting the number of high current spikes supplied to the actuator 125. For example, while the actuator 125 is not moving, the current may have a maximum value of between approximately 1 A and approximately 3 A, for example about 2 A. When the actuator 125 is moving, the current may have a maximum value of between approximately 3 A and approximately 5 A, for example about 4 A. The controller 200 may count the number of times the current reaches its maximum value to determine the number of times the actuator 125 moved. (i.e., the number of steps performed by the stepper motor). The controller 200 may then determine the position of the actuator 125 based on a predetermined actuation distance and the number of times the actuator 125 was actuated. For example, the actuator 125 may actuate 'N' number of times and have a predetermined distance of actuation 'D'. The total distance that the actuator has moved is thus the product of 'N' and 'D'. The controller 200 may store the position of the actuator 125 in the memory device 410 (e.g., non-volatile memory).

In some embodiments, the actuator 125 is configured as a stepper motor. In these embodiments, the controller 200 may determine the position of the actuator 125 by detecting current spikes in the stepper motor. The controller 200 may further determine the direction and displacement of actuation based on the order of stator activation and desired step size (e.g., full step, half step, etc.). For example, the expansion valve assembly 120 may have an actuator 125, configured as a stepper motor. The stepper motor may have a rotor configured to rotate and drive a shaft coupled to a valve (e.g., the expansion valve 121 configured to change the pressure of the refrigerant) and a stator configured to remain stationary and selectively receive an electrical charge (e.g., from the controller 200). The controller 200 may send a signal to the stepper motor (e.g., an electrical signal) configured to selectively power part of the stator such that the powered portion of the stator electromagnetically attracts an oppositely charged portion of the rotor. The signal sent by the controller 200 to the stepper motor may be a current spike configured to temporarily charge a portion of the stator. The signal may have a relatively lower magnitude (e.g., about 2 A) such that the rotor does not rotate and maintains positional accuracy, or the signal may have a relatively higher magnitude (e.g., about 5 A) such that the rotor rotates by a predetermined distance and direction (e.g., one step, one half step, etc.). Additionally, the signal may be sent periodically (e.g., multiple times a second) with no signal between each period. The signal may be measured by the actuator sensor 325. The controller 200 may receive the measurement from the actuator sensor 325 (e.g., by actuator interface 450) and store the measurement in the memory device 410 (e.g., non-volatile memory).

The controller 200 is further configured to detect a system power failure. In the event of a power failure, the controller 200 is configured to advantageously retrieve the position of the actuator 125 from the memory device 410 such that the controller 200 may resume normal operation immediately after the power is restored to the system.

Figure 5:
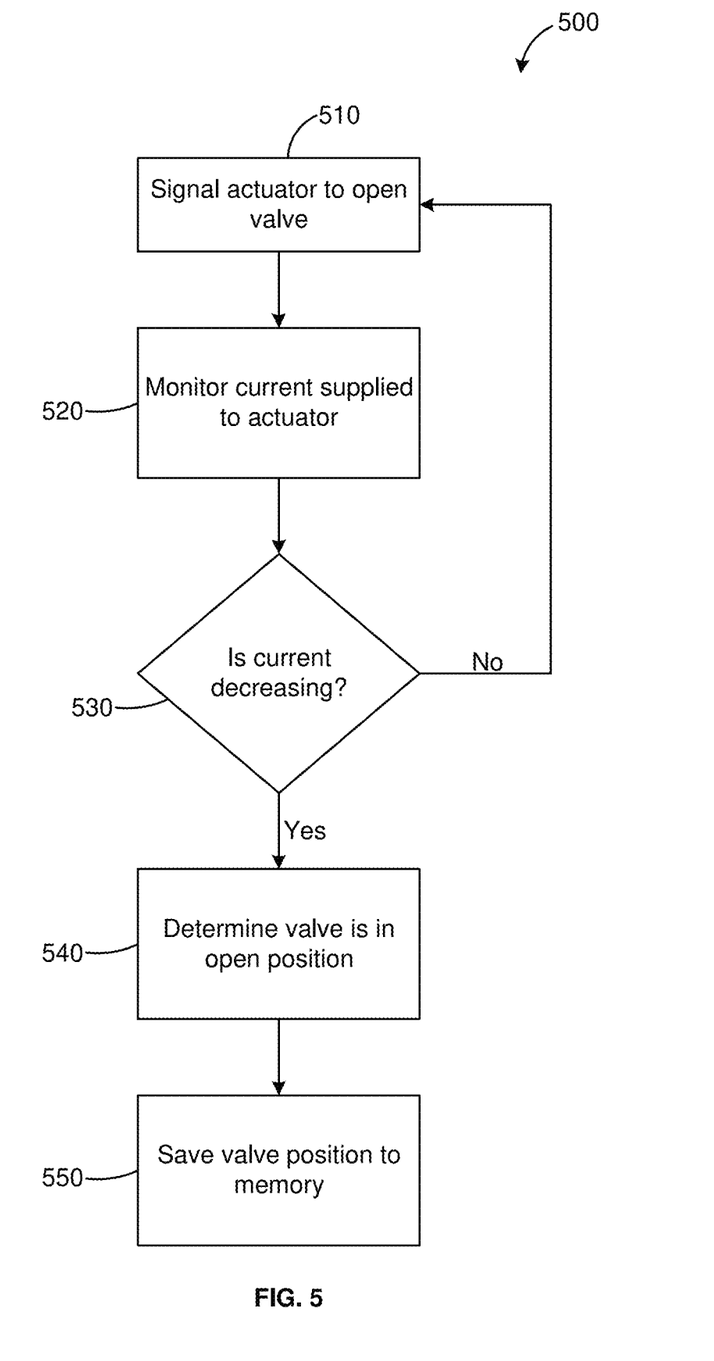
FIG. 5 is a flowchart of a process for calibrating the controller of FIG. 4, according to an exemplary embodiment.
Figure 6:
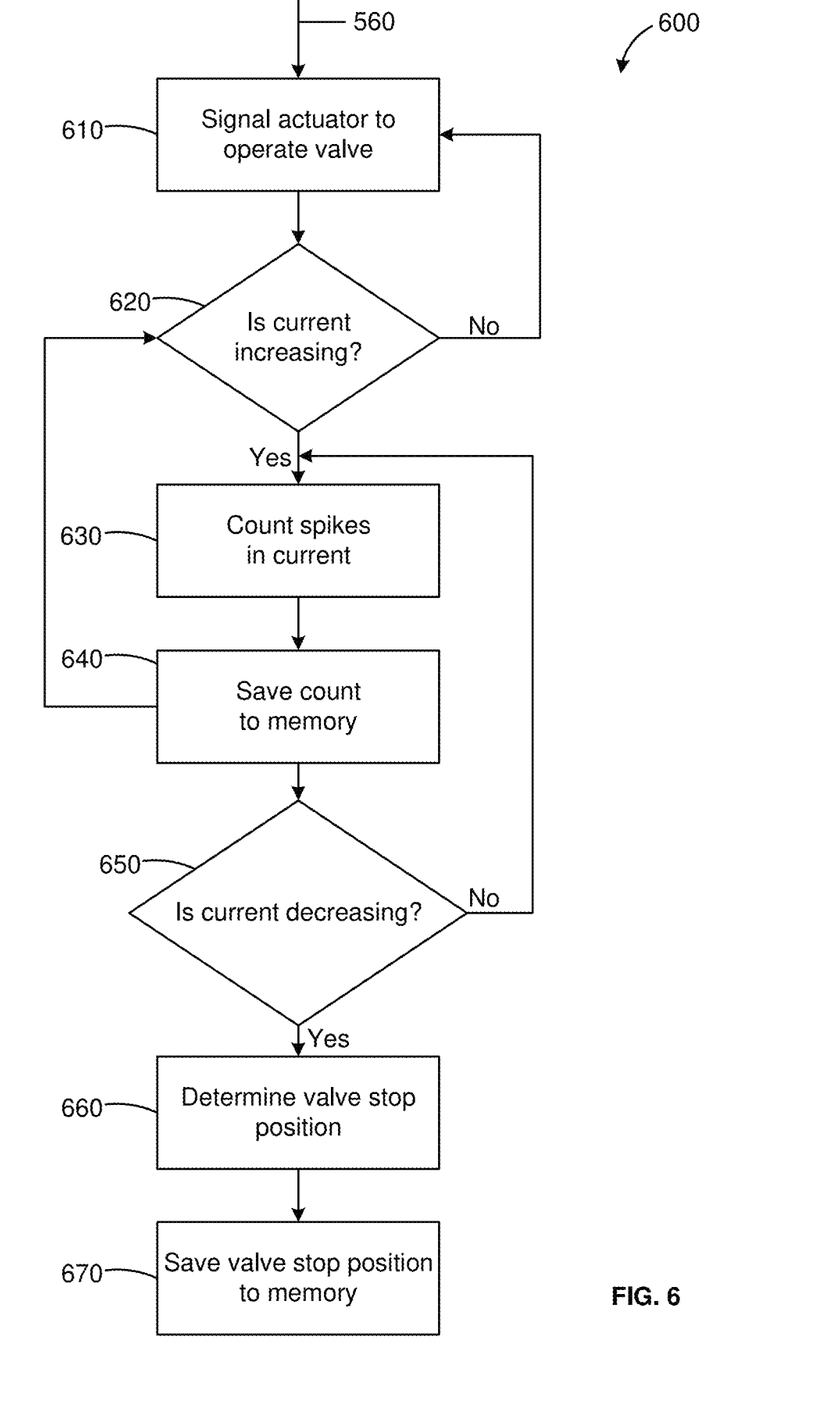
FIG. 6 is a flowchart of a process for detecting the position of an expansion valve of the refrigeration system of FIG. 2, according to an exemplary embodiment.
Figure 7:
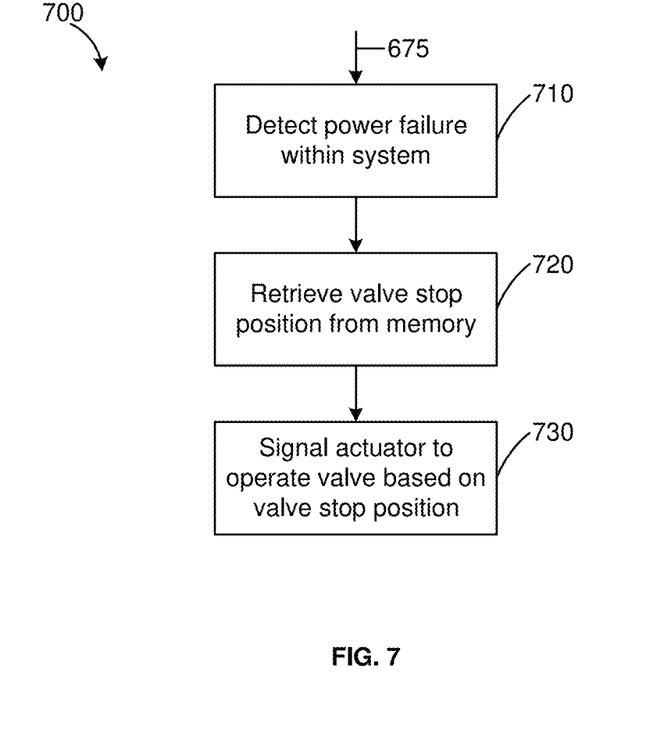
FIG. 7 is a flowchart of a process for power failure response of the refrigeration system of FIG. 2, according to an exemplary embodiment.

Now referring to FIGS. 5-7, flowcharts of methods for controller calibration, position detection, and power failure response are shown, respectively. In an exemplary embodiment, the methods shown are performed by the controller 200 and connected components shown in FIGS. 1-4. Referring specifically to FIG. 5, a method 500 for calibrating the controller 200 for position detection is shown.

At step 510, the controller 200 sends a signal (e.g., by the actuator interface 450) to the actuator 125 to move to a first position (e.g., a fully open position). The signal may be an electrical signal configured to power part of the actuator 125 (e.g., the stator of a stepper motor). Alternatively, the controller 200 may indirectly signal the actuator 125 to move by sending the signal to the power supply 190 such that the power supply 190 provides an electrical signal (e.g., power) to the actuator 125. The signal may be periodic (e.g., multiple times per second) with no signal between periods (See FIG. 9, described below).

At step 520, the actuator sensor 325 detects a current of the power supplied to the actuator 125 (e.g., either directly or indirectly supplied by the controller 200). The controller 200 is configured to receive values of the detected current from the actuator sensor 325 (e.g., by actuator interface 450). The controller may store the values of the current in the memory device 410.

At step 530, the controller 200 determines if the maximum values of the current are decreasing. For example, the processor 405 may read the values of the current stored in the memory device 410. The values may be at or near a maximum value (e.g., 5 A) when the controller 200 is sending the signal to the actuator 125, or the values may be at or near 0 A when the controller 200 is not sending the signal (e.g., between periods or steps of a stepper motor). If the processor 405 determines that the maximum value of the current is sufficiently decreasing (e.g. decreasing from about 5 A to about 2 A) the controller 200 determines that the actuator has stopped moving and continues to step 540. If not, the controller 200 returns to step 510 (See FIG. 8, described below).

At step 540, the controller 200 determines that the actuator 125 reached the open position based on the determination at step 530.

At step 550, the controller 200 saves the open position to the memory device 410. The controller 200 is configured to selectively retrieve the open position from the memory device 410 (e.g., in the event of a power failure).

Now referring to FIG. 6, a method 600 of determining the position of the actuator 125 is shown, according to an exemplary embodiment. Method 600 may continue from method 500 of FIG. 5 as shown by method line 560.

At step 610, the controller 200 signals to the expansion valve assembly 120 to begin operating. For example, the controller 200 may signal to the expansion valve assembly 120 to change the pressure of the refrigerant. More specifically, in the embodiment shown, step 610 includes the controller 200 signaling (i.e., electronically controlling) the actuator 125 to actuate the expansion valve 121.

At step 620, the controller 200 detects the current supplied to the actuator 125 by the actuator sensor 325 and determines if the current is increasing. Similar to step 530 of FIG. 5, step 620 includes determining if the maximum value of the current supplied to the actuator 125 is increasing (e.g., from 2 A to 5 A). If the current is not increasing the controller 200 returns to step 610. If the current is increasing, the controller 200 continues to step 630.

At step 630, the controller 200 begins counting spikes in current. For example, the controller may count the number of times the current spikes to the maximum value (e.g., 5 A).

At step 640, the controller 200 saves the count to the memory device 410. In some embodiments, the controller 200 may periodically or continuously (e.g., by an interrupt) repeat back to step 620.

At step 650, the controller 200 detects, by the actuator sensor 325, whether the current is decreasing (e.g., from about 5 A to about 2 A). If the current is not decreasing, the controller 200 returns to step 530. If the current is decreasing, the controller 200 continues to step 660.

At step 660, the controller 200 determines that the actuator 125 has stopped moving the expansion valve 121 based on the determination at step 650.

At step 670, the controller 200 saves the position of the actuator 125 to the memory device 410. In other embodiments, the controller may continuously update the position of the actuator 125 while the actuator 125 is moving. For example, the controller 200 may perform step 660 and step 670 continuously during while executing the method 600 such that the position of the actuator 125 is continuously updated.

Now referring to FIG. 7 a method 700 of responding to a power failure is shown.

At step 710 the controller 200 detects that a power failure had occurred within the system. For example, the power failure may include the power supply 190 failed and was repaired or replaced. The controller 200 may perform step 710 responsive to power being restored.

At step 720, the controller 200 retrieves the valve stop position from the memory device 410.

At step 730, the controller 200 signals to the actuator 125 to resume normal operations based on the valve stop positon. For example, the controller may signal to the actuator 125 to move the expansion valve 121 relative to its current position (e.g., based on the position of the actuator 125).

Figure 8:
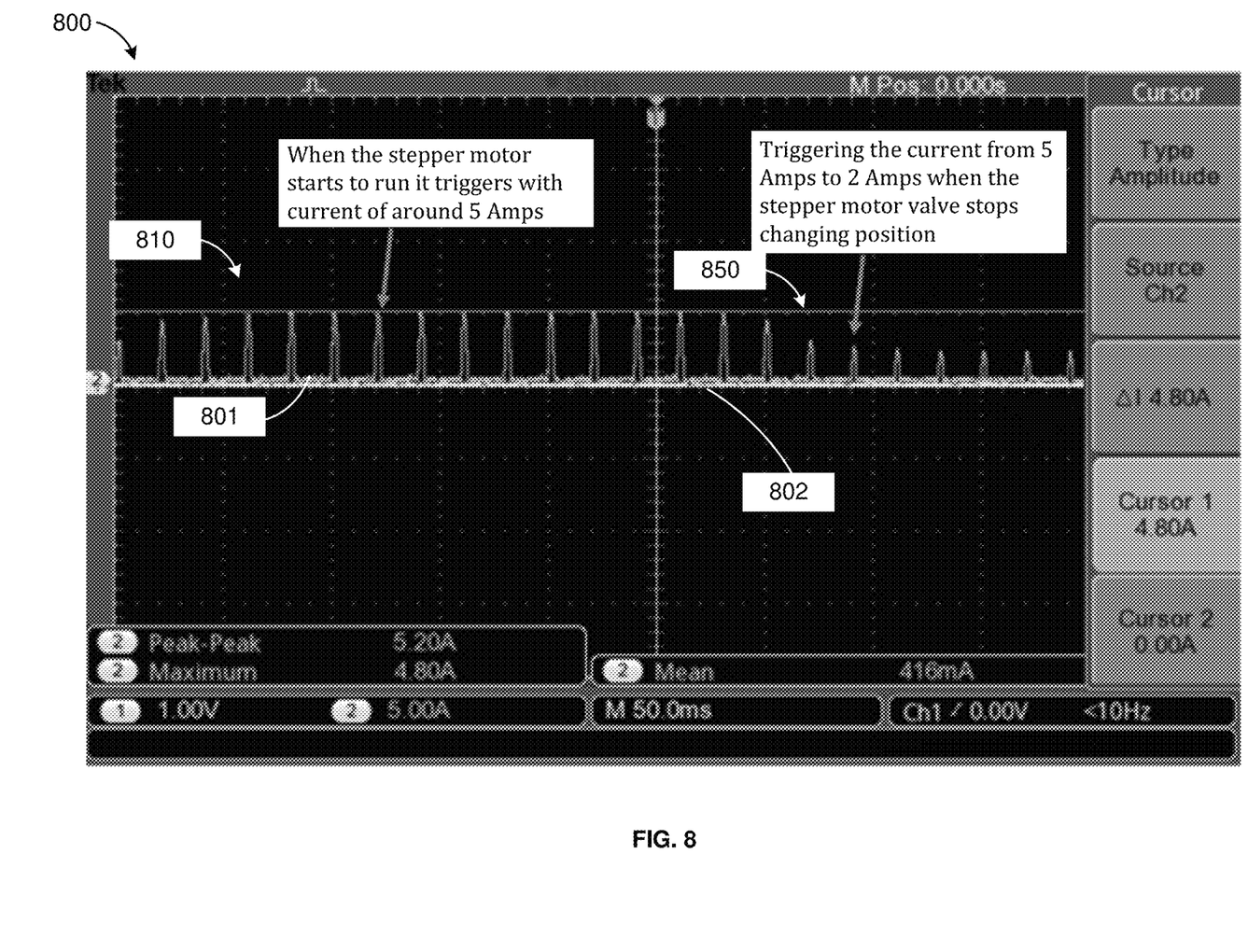
FIG. 8 is a chart of current vs time measured within the refrigeration system of FIG. 2, according to an exemplary embodiment.

FIG. 8 shows a graph 800 of current 801 (Amps) vs time 802 (milliseconds) of current supplied to the actuator 125 either directly or indirectly by controller 200 and measured by actuator sensor 325. The graph 800 has a first region 810 where the current 801 is at a maximum value (e.g., at a current spike) shown as about 5 A. Here, the maximum value of the current 801 indicates the actuator 125 (e.g., stepper motor) is moving. The graph 800 also has a second region 850 where the maximum value of the current 801 is decreasing to about 2 A. Here, the decrease in the maximum value of the current 801 indicates that the actuator 125 is no longer moving.

Figure 9:
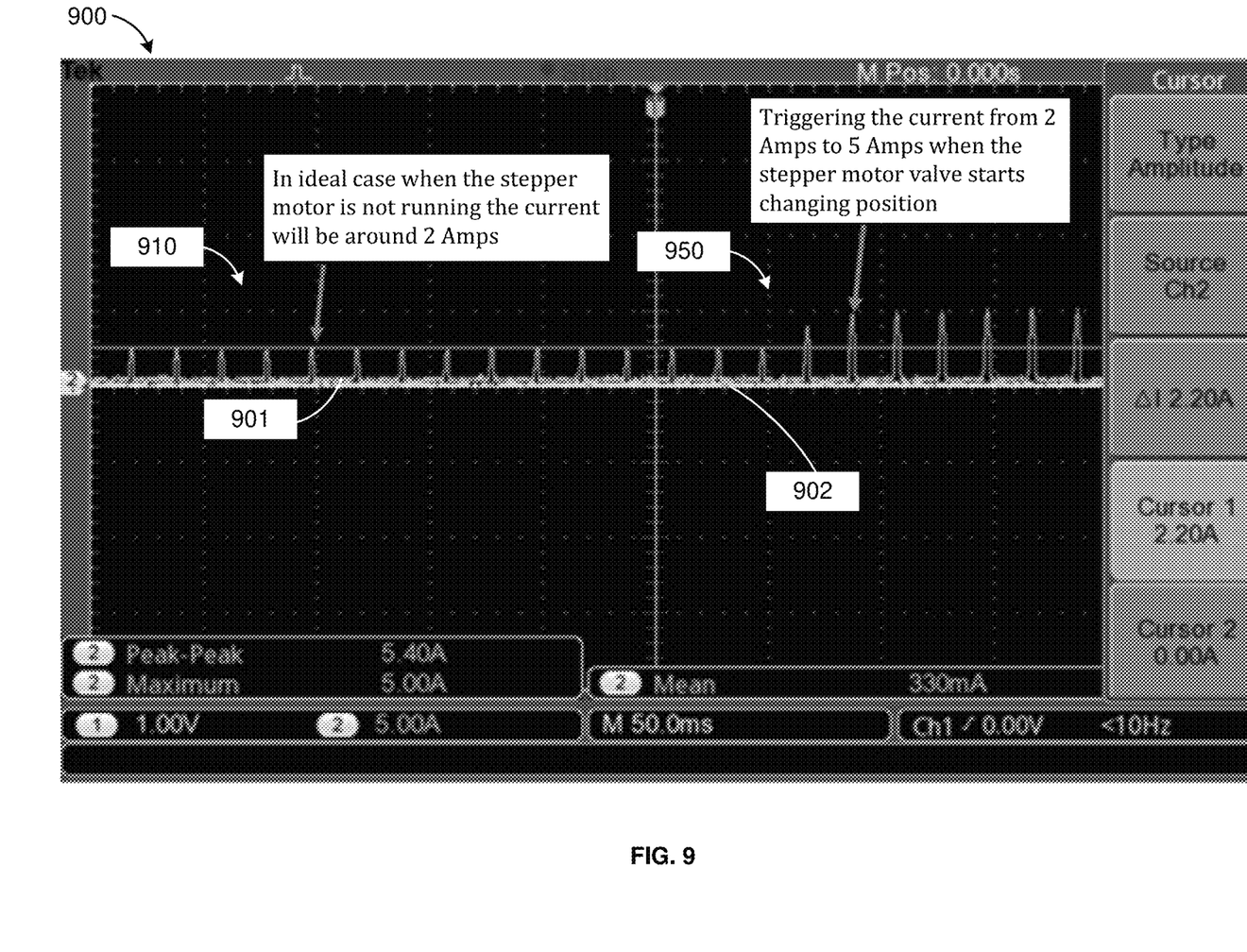
FIG. 9 is a chart of current vs time measured within the refrigeration system of FIG. 2, according to an exemplary embodiment.

FIG. 9 shows a graph 900 of current 901 (Amps) vs time 902 (milliseconds) of current supplied to the actuator 125 either directly or indirectly by controller 200 and measured by actuator sensor 325. The graph 900 has a first region 910 where the current 901 is at a maximum value shown as about 2 A. Here, the maximum value of the current 901 indicates the actuator 125 (e.g., stepper motor) is not moving. The graph 900 also has a second region 950 where the maximum value of the current 901 is increasing to about 5 A. Here, the increase in the maximum value of the current 901 indicates that the actuator 125 has begun moving.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The construction and arrangement of the elements of the refrigeration system and valve positioning system as shown in the exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The background section is intended to provide a background or context to the invention recited in the claims. The description in the background section may include concepts that could be pursued, but are not necessarily ones that have been previously conceived or pursued. Therefore, unless otherwise indicated herein, what is described in the background section is not prior art to the description and claims and is not admitted to be prior art by inclusion in the background section.

It is important to note that the construction and arrangement of the systems and methods as shown in the various exemplary embodiments is illustrative only. Additionally, any element disclosed in one embodiment may be incorporated or utilized with any other embodiment disclosed herein. For example, the methods of the exemplary embodiment described in at least paragraph(s) [0040] may be incorporated with any of the components of the refrigeration system of the exemplary embodiment described in at least paragraph(s) [0018]. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A refrigerated display case comprising:
   a housing defining a temperature controlled space;
   a refrigeration system coupled to the housing and operable to affect a temperature of the temperature controlled space, and comprising:
      an actuator configured to operate an expansion valve, the actuator comprising a stepper motor such that the expansion valve is selectively operated by the stepper motor to a plurality of discrete positions;
   a controller configured to:
      update a stored position of the actuator based on measurement of an electric current provided to the actuator;
      retrieve the stored position after a power failure;
      restart control based on the stored position of the actuator;
      send a signal that comprises a current spike to the stepper motor to selectively change a position of the plurality of discrete positions of the actuator;
      selectively provide the electric current provided to the actuator;
      detect a magnitude change in the electric current provided to the actuator;
      based on the detected magnitude change, determine a particular position of the plurality of discrete positions of the actuator; and
      store the particular determined position of the plurality of discrete positions of the actuator.

2. The refrigerated display case of claim 1, wherein the controller is further configured to:
   detect, by a sensor, an electrical property of the actuator; and
   update, based on the electrical property, the stored position of the actuator.

3. The refrigerated display case of claim 1, wherein the refrigeration system further comprises:
   a fluid disposed within the refrigeration system, the fluid configured to facilitate thermal energy exchange;
   a compressor configured to increase a pressure of the fluid;
   a condenser fluidly coupled to the compressor and configured to reduce a thermal energy of the fluid;
   the expansion valve fluidly coupled to the condenser, and configured to decrease the pressure of the fluid; and
   an evaporator fluidly coupled to the expansion valve and the compressor and configured to increase the thermal energy of the fluid.

4. The refrigerated display case of claim 2, wherein the controller further comprises:
   an actuator interface configured to selectively interface with the actuator;
   a sensor interface configured to interface with the sensor; and
   a non-volatile memory configured to store a position of the actuator.

5. The refrigerated display case of claim 4, wherein the controller is further configured to:
   detect the magnitude change in the electric current provided to the actuator by detecting that the electric current is decreasing;
   determine that the actuator is in a first position of the plurality of discrete positions based on the electric current decreasing; and
   store the first position in the non-volatile memory.

6. The refrigerated display case of claim 5, wherein the controller is further configured to:
   detect the magnitude change in the electric current provided to the actuator by detecting that the electric current is increasing;
   detect at least one spike in the electric current;
   store the at least one spike in the non-volatile memory;
   determine that the electric current is decreasing to a first threshold;
   determine, based on the at least one spike, that the actuator is in a second position of the plurality of discrete positions; and
   store the second position in the non-volatile memory.

7. The refrigerated display case of claim 6, wherein the controller is further configured to:
   detect the power failure; and
   retrieve, responsive to the power failure, the first position from the non-volatile memory.

8. The refrigerated display case of claim 1, wherein the signal comprises at least one of a lower magnitude signal such that a rotor of the stepper motor does not rotate and maintains positional accuracy or a higher magnitude signal such that the rotor of the stepper motor rotates to move a shaft coupled to the expansion valve by a predetermined distance and a predetermined direction.

9. The refrigerated display case of claim 8, wherein the lower magnitude signal is about 2 amps, and the higher magnitude signal is about 5 amps.

10. The refrigerated display case of claim 8, wherein the predetermined distance comprises at least one of a one half step or a one step.

11. A method of monitoring valve deflection in a refrigeration system comprising:
    selectively operating an actuator that comprises a stepper motor, the actuator configured to move an expansion valve to a plurality of discrete positions;
    detecting a magnitude change in at least one electric property provided to the actuator;
    subsequent to the detected magnitude change, sensing a current spike of the stepper motor;
    determining a magnitude of the current spike;
    based on the detected magnitude change and magnitude of the current spike, determining a particular position of a plurality of positions of the actuator, the actuator configured to operate the expansion valve of the refrigeration system; and storing the particular position of the actuator such that the particular position is retrievable by a controller after a power failure.

12. The method of claim 11, wherein the signal comprises at least one of a lower magnitude signal such that a rotor of the stepper motor does not rotate and maintains positional accuracy or a higher magnitude signal such that a rotor of the stepper motor rotates to move a shaft coupled to the expansion valve by a predetermined distance and a predetermined direction.

13. The method of claim 11, further comprising calibrating the controller based on a configuration of the actuator.

14. The method of claim 11, further comprising:
    storing the at least one electrical property of the actuator to a non-volatile memory; and
    determining the position of the actuator based on at least the at least one electrical property.

15. The method of claim 14, wherein the at least one electrical property is at least one of an electric current, an electric voltage, or a power supplied to the actuator.

16. The method of claim 14, further comprising resuming, responsive to the power failure, operation of the actuator based on the position of the actuator.

17. The method of claim 14, wherein determining the position of the actuator further comprises:
    determining that the actuator is in a first position;
    detecting at least one electrical event related to the electrical property;
    storing the electrical event to the non-volatile memory;
    detecting the power failure;
    retrieving, responsive to detecting the power failure, the electrical event from the non-volatile memory; and
    determining, by the controller, a second position of the actuator based on the at least one electrical event.

18. The method of claim 17, wherein the electrical event is at least one of a current spike, a voltage spike, or a power spike.

19. The method of claim 12, wherein the lower magnitude signal is about 2 amps, and the higher magnitude signal comprises about 5 amps.

20. The method of claim 12, wherein determining the position of the actuator further comprises determining a predetermined distance of a one half step or one step.

* * * * *